UNITED STATES PATENT OFFICE.

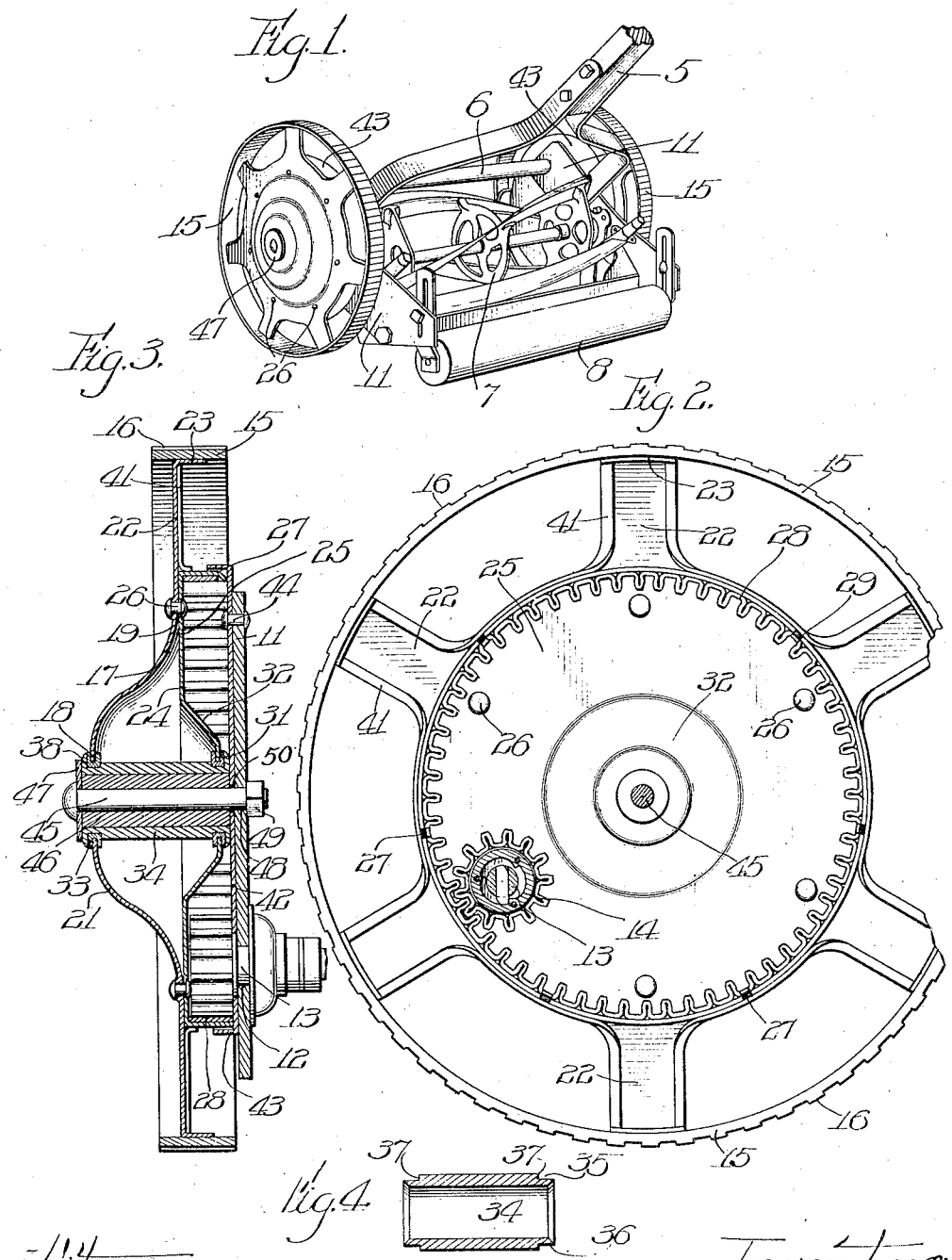

ALLEN JOHNSTON AND CHARLES M. KRANER, OF OTTUMWA, IOWA, ASSIGNORS TO JOHNSTON PRESSED GEAR COMPANY, OF OTTUMWA, IOWA, A CORPORATION OF IOWA.

WHEEL FOR LAWN-MOWERS AND THE LIKE.

1,382,089.  Specification of Letters Patent.  Patented June 21, 1921.

Application filed January 25, 1918. Serial No. 213,624.

*To all whom it may concern:*

Be it known that we, ALLEN JOHNSTON and CHARLES M. KRANER, both citizens of the United States, residing in Ottumwa, in the county of Wapello and State of Iowa, have invented a new and useful Improvement in Wheels for Lawn-Mowers and the like, of which the following is a specification.

This invention relates in general to sheet metal wheels and has more particular reference to sheet metal wheels provided for use in lawn mowers and the like, where it is desired to provide a gear with the wheel.

A principal object of the invention is the provision of a light, strong and durable wheel particularly adapted for rough usage and readily able to stand severe shocks without deterioration.

A still further and highly important object of this invention is to provide a lawn mower of improved construction, the improvements, however, residing chiefly in the wheels and adjacent and coöperating parts.

Numerous other objects and advantages of the invention will be apparent as it is better understood from the following description when considered in connection with the accompanying drawing illustrating a preferred embodiment thereof.

Referring to the drawing:

Figure 1 is a perspective view of a lawn mower provided with wheels embodying the present invention.

Fig. 2 is a section through the same taken vertically just inwardly of a wheel.

Fig. 3 is a similar section taken at right angles to the section shown in Fig. 1; and Fig. 4 is a detailed section view of the bearing member before positioning.

Referring first to Fig. 1, reference character 5 designates the handle of the lawn mower, reference character 6 the frame, reference character 7 the reel, reference character 8 the roller, all of which may have in general any usual or preferred construction and are shown on the drawing merely for the purposes of illustration.

It should be mentioned, however, that the frame includes two side plates or bars 11, which provide a bearing at 12 for the lawn mower reel shaft 13 carrying the sheet metal pinion 14 connected to the shaft by a ratchet and pawl engagement.

Each of the wheels of the lawn mower comprise a tread 15 serrated at 16 in the usual fashion. This tread portion is connected with a main sheet metal web 17 perforated at its center at 18 and having a wide annular part 19 about said perforation, which annular part is domed or bulged, as indicated at 21 for a purpose which will be presently described.

Outwardly of the annular part 19 the material of the web 17 is cut away to provide spokes 22, which are bent over at their ends at 23 to provide flanges secured to the inner face of the tread 15.

The second sheet metal member 24 forms a part of the web and is of less diameter than the outer transverse dimension of the member 17. The sheet metal member 24 has a flat outer part 25 resting against and in contact with the outer portion of the annular part 19 of the member 17, *i. e.* the part beyond the domed central part 21. The contacting portions of the two sheet metal members are riveted at 26 or otherwise suitably and permanently fastened together. The edge 27 of the part 24 is bent outwardly into a cylindrical flange and within this flange is seated a sheet ring 28 corrugated to provide gear teeth engaging the pinion 14. The outer edge of this sheet is notched at 29 at intervals and between the teeth of the gear, and into these notches the material of the flange 27 is bent to lock the parts together. The member 24 is perforated at its center at 31, and is bulged or domed at 32 about said perforation and in a direction opposite to the direction of bulging or doming of the part 21, thereby spacing the perforations at 18 and 31 widely apart. The edges of the material of the sheets 17 and 24 about the perforations are reinforced by sheet metal channels 33 formed upon the edges and a bearing or hub member 34 engages the reinforced edges to complete the hub construction. The member 34 as shown in Fig. 4 is countersunk or recessed at 35 to produce ends 36 of reduced diameter and shoulders 37 inwardly of said ends. The bearing or hub member 34 is positioned between the sheet metal members before they are secured together and the ends 36 protrude through the perforations. Thereafter the ends 36 are swaged or riveted over to bind the reinforced edges of the sheet metal members between the shoulders 37 and the rivet heads 38.

The spokes 22 are reinforced about their edges through the bending outwardly of narrow flanges 41. The bending of the spoke edges is continued about the outer edges of the annular portion 19 of the member 17 located between the spokes, so that independently of the flanges 23 at the ends of the spoke the member 29 is flanged about its outer edge with continuous flanges extending from the tread at the side of one spoke to the tread at the adjacent side of the next adjacent spoke. A housing plate 42, having an outstanding cylindrical flange 43 of diameter slightly greater than the outer diameter of the flange 27, is fastened upon the frame or plate 11 by rivets or other suitable means 44, and when the parts are assembled this flange extends over the flange 27 to protect the gearing. The parts are secured together by a bolt 45 embraced by a bearing sleeve 46, both extending through the bearing member or hub 34, a washer 47 being provided at the outer end to engage the outer end of the member 34. The bolt 45 extends through registering perforations 50 and 48 in the housing member 43 and plate 11, a nut 49 holding it in place.

It is thought that the invention and many of its attendant advantages will be better understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A wheel comprising an external sheet metal portion flanged at its outer edge and pressed outwardly at its center, a smaller sheet metal flanged portion joined to the inner side of said first-mentioned portion and pressed oppositely at its center to form a bulging hub, said sheets being perforated centrally to receive a bearing, a gearing secured to the inner side of the smaller flanged portion, and a corrugated strip secured to the outer side of the flange of the larger portion.

2. A wheel comprising a flanged sheet metal gear-supporting member pressed inwardly at its center, a flanged sheet metal tread-supporting member pressed outwardly at its center to form with the inwardly pressed portion of said flanged gear-supporting member a bulging hub, a central bearing through said hub and rigidly joining both said portions together, and gearing secured to the inside of said flanged gear-supporting member.

3. A wheel comprising a flanged sheet metal gear-supporting member pressed inwardly at its center, a flanged sheet metal tread-supporting member pressed outwardly at its center to form with the inwardly pressed portion of said flange gear-supporting member a bulging hub, said members being joined and forming the web of the wheel, a central bearing through said hub and rigidly joining both said portions together, and sheet metal gearing secured to the inside of said flanged gear-supporting member.

4. A wheel formed of two sheet metal circular flanged members of different diameter secured in contact with each other and having their centers deflected oppositely to provide a hub, a tread providing member secured to one of said flanges, and an internal driving gear secured to the other.

5. A wheel comprising two circular flanged sheet metal members of different diameter secured together with the flanges extending in the same direction, a member mounted on one of said flanges to provide a tread, and a member mounted within the other flange to provide an internal gear.

6. A wheel comprising a tread, a single metal sheet connected with the tread at its outer edge, a bearing member to which said sheet is connected at its inner edge, and a second sheet provided with gear-supporting means, and contacting adjacent its outer edge with an interior concentric portion of said first mentioned sheet and at its inner edge with said bearing member, the portions of both said sheets connecting with said bearing member being bulged outwardly to provide an elongated hub.

7. A wheel comprising a tread, a pair of sheet metal members of different diameter and of general annular form contacting with each other and secured together intermediate the tread and axis of the wheel and near the outer extremity of one of said members, the centers of said sheet metal members being pressed outwardly, and the member of lesser diameter being provided with an annular gear-supporting flange and a bearing member disposed through said centers and engaging said sheet metal members at its ends.

8. A wheel comprising a tread, a sheet metal single tread-supporting member perforated at its center and having a relatively wide annular hub-forming part about said perforation, the inner portion of said annular part being domed or bulged, and an auxiliary gear-supporting and hub forming member oppositely domed or bulged and having its edge in contact with and secured to said annular part beyond the bulging portion thereof and inwardly of the tread a substantial distance.

9. A wheel comprising a tread, a sheet metal member perforated at its center and having a wide annular portion surrounding said perforation, projections extending out from said annular portion forming spokes connected to the tread, the edges of said member about said spokes and between said spokes being flanged at right angles to the general plane of said member, and an auxiliary hub-forming member having its outer edge secured to the outer part of said annular portion, said members being oppositely bulged at their centers to form a hub.

10. A wheel comprising a tread, a bearing member, a single sheet metal tread-supporting member connecting said tread with said bearing member, and a sheet-metal member connecting said first named member with said bearing member and having a gear-supporting outer flange, said sheet metal members being bulged and perforated at their centers and reinforced about said perforations and engaging said bearing member.

11. A wheel comprising a tread, a bearing member, a single sheet metal tread-supporting member connecting said tread with said bearing member, and a sheet metal member connecting said first named member with said bearing member and having a gear-supporting outer flange, the ends of said bearing member projecting through perforations in said sheet metal members and riveted down thereover.

12. A wheel comprising a tread, a bearing member, a single sheet metal tread-supporting member connecting said tread with said bearing member, and a sheet metal member connecting said first named member with said bearing member and having a gear-supporting outer flange, both said sheet metal members being perforated at their centers, said bearing member having reduced ends extending through said perforations and said members bearing against shoulders formed by the reduction of said ends.

13. A wheel having a tread and a central bearing, a sheet metal connection between said tread and said bearing, a sheet metal member secured to said connection and to said bearing, said member having a cylindrical flange extending out from the wheel and a sheet metal gear seated within said flange, the sheet metal of said flange and said gear being interlocked.

14. A wheel having a tread and a central bearing, a sheet metal connection between said tread and said bearing, a sheet metal member secured to said connection and to said bearing, said member having a cylindrical flange extending out from the wheel and a sheet metal gear seated within said flange, said flange having portions extending into said gear to lock the two together.

ALLEN JOHNSTON.
CHARLES M. KRANER.